US012339351B2

(12) United States Patent
Liu et al.

(10) Patent No.: US 12,339,351 B2
(45) Date of Patent: Jun. 24, 2025

(54) RANGING METHOD AND APPARATUS

(71) Applicant: HUAWEI TECHNOLOGIES CO., LTD., Guangdong (CN)

(72) Inventors: Chenchen Liu, Shenzhen (CN); Baojian Zhou, Shenzhen (CN); Xiao Han, Shenzhen (CN); Rui Du, Shenzhen (CN); Meihong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 506 days.

(21) Appl. No.: 17/836,659

(22) Filed: Jun. 9, 2022

(65) Prior Publication Data

US 2022/0299629 A1  Sep. 22, 2022

Related U.S. Application Data

(63) Continuation of application No. PCT/CN2020/134185, filed on Dec. 7, 2020.

(30) Foreign Application Priority Data

Dec. 12, 2019 (CN) .......................... 201911275616.9

(51) Int. Cl.
*G01S 13/84* (2006.01)
*G01S 7/00* (2006.01)
*H04L 27/26* (2006.01)

(52) U.S. Cl.
CPC .............. *G01S 13/84* (2013.01); *G01S 7/006* (2013.01); *H04L 27/2601* (2013.01)

(58) Field of Classification Search
CPC ........ G01S 13/84; G01S 7/006; G01S 13/003; G01S 5/00; G01S 13/36; G01S 13/878;
(Continued)

(56) References Cited

U.S. PATENT DOCUMENTS 5,801,818 A  9/1998 Corrigan et al.
8,644,768 B2  2/2014 Kluge et al.
(Continued)

FOREIGN PATENT DOCUMENTS

CN  101299231 A  11/2008
CN  105572662 A  5/2016
(Continued)

OTHER PUBLICATIONS

IEEE 802.15-13-0054-02-004n, "Proposal of Ranging Capabilities with PHY Supporting CMB," Jan. 14, 2013, 16 pages.
(Continued)

*Primary Examiner* — Bernarr E Gregory
*Assistant Examiner* — Juliana Cross
(74) *Attorney, Agent, or Firm* — Fish & Richardson P.C.

(57) ABSTRACT

The disclosure provides ranging methods and apparatuses. One example method includes that a first device sends a first signal on a first channel. The first device receives, on a second channel, a second signal from a second device, where the second signal is a signal obtained after frequency conversion is performed on the first signal. The first device calculates a distance between the first device and the second device based on a phase difference between carriers of the second signal.

20 Claims, 11 Drawing Sheets

(58) Field of Classification Search
CPC ............. H04L 27/2601; H04L 27/2613; H04L 27/2075; H04L 27/2656; H04L 27/2662; H04W 72/0446; H04W 72/0453; H04W 64/00; H04W 24/08; H04W 4/023; H04W 24/10

See application file for complete search history.

(56) References Cited

U.S. PATENT DOCUMENTS

| | | |
|---|---|---|
| 2008/0150699 A1 | 6/2008 | Ohara et al. |
| 2010/0109849 A1* | 5/2010 | Wang ............... G01S 5/18 340/10.5 |
| 2010/0220012 A1 | 9/2010 | Reede |
| 2018/0136309 A1* | 5/2018 | Lo Monte ............. G01S 5/0231 |
| 2020/0296614 A1* | 9/2020 | Lee ................... H04W 64/006 |

FOREIGN PATENT DOCUMENTS

| | | | |
|---|---|---|---|
| CN | 105589506 A | | 5/2016 |
| CN | 108537305 A | * 9/2018 | ......... G06K 17/0029 |
| CN | 110088644 A | | 8/2019 |
| CN | 110174644 A | | 8/2019 |
| WO | 2019093791 A1 | | 5/2019 |

OTHER PUBLICATIONS

IEEE Std 802.11, "IEEE Standard for Information Technology—Telecommunications and Information Exchange Between Systems; Local and Metropolitan Area Networks—Specific requirements; Part 11: Wireless LAN Medium Access Control (MAC) and Physical Layer (PHY) Specifications," Approved Dec. 7, 2016, 3534 pages.

International Search Report and Written Opinion in International Appln. No. PCT/CN2020/134185, mailed on Mar. 8, 2021, 15 pages (with English translation).

* cited by examiner

RANGING METHOD AND APPARATUS

CROSS-REFERENCE TO RELATED APPLICATIONS

This application is a continuation of International Application No. PCT/CN2020/134185, filed on Dec. 7, 2020, which claims priority to Chinese Patent Application No. 201911275616.9, filed on Dec. 12, 2019. The disclosures of the aforementioned applications are hereby incorporated by reference in their entireties.

TECHNICAL FIELD

This application relates to the wireless communication field, and in particular, to a ranging method and apparatus.

BACKGROUND

In an existing ranging method, round-trip time (round-trip time, RTT) of signal transmission between a transmit end and a receive end is calculated by interaction between the transmit end and the receive end, and then a distance between the transmit end and the receive end is calculated based on a propagation speed of an electromagnetic wave. However, due to limitations of system bandwidth and an indoor multipath environment, a minor time error corresponds to a large ranging error. Therefore, measurement accuracy of this method is limited.

SUMMARY

This application provides a ranging method, to improve ranging efficiency and ranging accuracy.

According to a first aspect, a ranging method is provided, where the method includes: A first device sends a first signal on a first channel. The first device receives, on a second channel, a second signal from a second device, where the second signal is a signal obtained after frequency conversion is performed on the first signal. The first device calculates a distance between the first device and the second device based on a phase difference between carriers of the second signal.

Based on the foregoing technical solution, the first device calculates the distance between the first device and the second device by measuring the phase difference between the carriers of the second signal actively reflected by the second device. This implements high-accuracy measurement of the distance between devices. High measurement accuracy can be ensured even when there is a multipath condition. In addition, when the method in this embodiment of this application is used for ranging, two user equipments do not need to interact with each other for a plurality of times. This improves ranging efficiency. When the first signal and the second signal are transmitted on different channels, interference between the signals can be further avoided. This ensures high ranging accuracy.

According to a second aspect, a ranging method is provided, where the method includes: A first device sends a first signal to a passive target on a first channel. The first device receives, on a second channel, a second signal from a second device, where the second signal is a signal obtained after frequency conversion is performed on the first signal. The first device calculates a sum of a distance between the passive target and the first device and a distance between the passive target and the second device based on a phase difference between carriers of the second signal. The first device determines a location of the passive target based on a transmit direction of the first signal and the sum of distances.

Based on the foregoing technical solution, with cooperation between two active devices, the first device may determine the location of the passive target based on a distance obtained by calculating the phase difference between the carriers of the second signal actively reflected by the second device and a direction in which the first device sends the first signal.

With reference to the first aspect or the second aspect, in some possible implementations, the method further includes: The first device sends a ranging request frame, where the ranging request frame includes information about the first channel and information about the second channel.

With reference to the first aspect or the second aspect, in some possible implementations, the method further includes: The first device receives a ranging request response frame from the second device, where the ranging request response frame is sent by the second device based on the ranging request frame, the ranging request response frame includes information about an available ranging time period, and the information about the available ranging time period is used to indicate a first time period. That a first device sends a first signal on a first channel includes: The first device sends the first signal on the first channel in the first time period.

With reference to the first aspect or the second aspect, in some possible implementations, the ranging request frame further carries at least one piece of the following information: duration information of the first signal and ranging method information.

With reference to the first aspect or the second aspect, in some possible implementations, the information about the first channel includes at least one piece of the following information: bandwidth of the first channel, a frequency channel number of the first channel, and a channel number of the first channel. The information about the second channel includes at least one piece of the following information: bandwidth of the second channel, a frequency channel number of the second channel, and a channel number of the second channel.

With reference to the first aspect or the second aspect, in some possible implementations, the first signal includes at least one orthogonal frequency division multiplexing (orthogonal frequency division multiplexing, OFDM) symbol, and the OFDM symbol does not include a guard interval.

Based on the foregoing technical solution, the first device performs ranging by sending the OFDM symbol that does not include the guard interval. This can avoid a problem that phase discontinuity occurs between adjacent carriers of the OFDM symbol and interference occurs between different signals. This ensures high ranging accuracy.

According to a third aspect, a ranging method is provided, where the method includes: A first device sends a first signal to a passive target on a first channel. The first device receives, on the first channel, a first signal reflected by the passive target. The first device calculates a distance between the passive target and the first device based on a phase difference between carriers of the first signal reflected by the passive target.

Based on the foregoing technical solution, when there is only one active device, the distance between the passive target and the first device may also be calculated.

According to a fourth aspect, a ranging method is provided, where the method includes: A second device receives a first signal on a first channel. The second device performs frequency conversion on the first signal to obtain a second signal. The second device sends the second signal on a second channel.

Based on the foregoing technical solution, the first device calculates a distance between the first device and the second device by measuring a phase difference between carriers of the second signal actively reflected by the second device. This implements high-accuracy measurement of the distance between devices. High measurement accuracy can be ensured even when there is a multipath condition. In addition, when the method in this embodiment of this application is used for ranging, two user equipments do not need to interact with each other for a plurality of times. This improves ranging efficiency. When the first signal and the second signal are transmitted on different channels, interference between the signals can be further avoided. This ensures high ranging accuracy.

With reference to the fourth aspect, in some possible implementations, the method further includes: The second device receives a ranging request frame from a first device, where the ranging request frame includes information indicating the first channel and information indicating the second channel.

With reference to the fourth aspect, in some possible implementations, the method further includes: The second device sends a ranging request response frame based on the ranging request frame, where the ranging request response frame includes information about an available ranging time period, and the information about the available ranging time period is used to indicate a first time period. That a second device receives a first signal on a first channel includes: The second device receives the first signal on the first channel in the first time period.

With reference to the fourth aspect, in some possible implementations, the ranging request frame further carries at least one piece of the following information: duration information of the first signal and ranging method information.

With reference to the fourth aspect, in some possible implementations, the information about the first channel includes at least one piece of the following information: bandwidth of the first channel, a frequency channel number of the first channel, and a channel number of the first channel. The information about the second channel includes at least one piece of the following information: bandwidth of the second channel, a frequency channel number of the second channel, and a channel number of the second channel.

With reference to the fourth aspect, in some possible implementations, the first signal includes at least one OFDM symbol, and the OFDM symbol does not include a guard interval.

Based on the foregoing technical solution, the first device performs ranging by sending the OFDM symbol that does not include the guard interval. This can avoid a problem that phase discontinuity occurs between adjacent carriers of the OFDM symbol and interference occurs between different signals. This ensures high ranging accuracy.

According to a fifth aspect, a ranging apparatus is provided, including a transceiver unit and a processing unit. The transceiver unit is configured to send a first signal on a first channel. The transceiver unit is further configured to receive, on a second channel, a second signal from a second device, where the second signal is a signal obtained after frequency conversion is performed on the first signal. The processing unit is configured to calculate a distance between the apparatus and the second device based on a phase difference between carriers of the second signal.

According to a sixth aspect, a ranging apparatus is provided, including a transceiver unit and a processing unit. The transceiver unit is configured to send a first signal to a passive target on a first channel. The transceiver unit is further configured to receive, on a second channel, a second signal from a second device, where the second signal is a signal obtained after frequency conversion is performed on the first signal. The processing unit is configured to calculate a sum of a distance between the passive target and the apparatus and a distance between the passive target and the second device based on a phase difference between carriers of the second signal. The processing unit is further configured to determine a location of the passive target based on a transmit direction of the first signal and the sum of distances.

With reference to the fifth aspect or the sixth aspect, in some possible implementations, the transceiver unit is further configured to send a ranging request frame, where the ranging request frame includes information about the first channel and information about the second channel.

With reference to the fifth aspect or the sixth aspect, in some possible implementations, the transceiver unit is further configured to receive a ranging request response frame from the second device, where the ranging request response frame is sent by the second device based on the ranging request frame, the ranging request response frame includes information about an available ranging time period, and the information about the available ranging time period is used to indicate a first time period. The transceiver unit is specifically configured to send the first signal on the first channel in the first time period.

With reference to the fifth aspect or the sixth aspect, in some possible implementations, the ranging request frame further carries at least one piece of the following information: duration information of the first signal and ranging method information.

With reference to the fifth aspect or the sixth aspect, in some possible implementations, the information about the first channel includes at least one piece of the following information: bandwidth of the first channel, a frequency channel number of the first channel, and a channel number of the first channel. The information about the second channel includes at least one piece of the following information: bandwidth of the second channel, a frequency channel number of the second channel, and a channel number of the second channel.

With reference to the fifth aspect or the sixth aspect, in some possible implementations, the first signal includes at least one OFDM symbol, and the OFDM symbol does not include a guard interval.

According to a seventh aspect, a ranging apparatus is provided, including a transceiver unit and a processing unit. The transceiver unit is configured to send a first signal to a passive target on the first channel. The transceiver unit is further configured to receive, on the first channel, a first signal reflected by the passive target. The processing unit is configured to calculate a distance between the apparatus and the passive target based on a phase difference between carriers of the first signal reflected by the passive target.

According to an eighth aspect, a ranging apparatus is provided, including a transceiver unit and a processing unit. The transceiver unit is configured to receive a first signal on a first channel. The processing unit is configured to perform frequency conversion on the first signal to obtain a second signal. The transceiver unit is further configured to send the second signal on a second channel.

With reference to the eighth aspect, in some possible implementations, the transceiver unit is further configured to receive a ranging request frame from the first device, where the ranging request frame includes information about the first channel and information about the second channel.

With reference to the eighth aspect, in some possible implementations, the transceiver unit is further configured to send a ranging request response frame based on the ranging request frame, where the ranging request response frame includes information about an available ranging time period, and the information about the available ranging time period is used to indicate a first time period. The transceiver unit is specifically configured to receive the first signal on the first channel in the first time period.

With reference to the eighth aspect, in some possible implementations, the ranging request frame further carries at least one piece of the following information: duration information of the first signal and ranging method information.

With reference to the eighth aspect, in some possible implementations, the information about the first channel includes at least one piece of the following information: bandwidth of the first channel, a frequency channel number of the first channel, and a channel number of the first channel. The information about the second channel includes at least one piece of the following information: bandwidth of the second channel, a frequency channel number of the second channel, and a channel number of the second channel.

With reference to the eighth aspect, in some possible implementations, the first signal includes at least one OFDM symbol, and the OFDM symbol does not include a guard interval.

According to a ninth aspect, a ranging device is provided, including a processor. The processor is coupled to a memory, and may be configured to execute instructions in the memory, to implement the method according to any one of the possible implementations of the first aspect to the fourth aspect. Optionally, the ranging device further includes a memory. Optionally, the ranging device further includes a communication interface, and the processor is coupled to the communication interface.

In an implementation, the ranging device is a communication device, for example, the first device and the second device in the embodiments of this application. When the ranging device is the communication device, the communication interface may be a transceiver or an input/output interface.

In another implementation, the ranging device is a chip configured in the communication device, for example, a chip configured in the first device and the second device in the embodiments of this application. When the ranging apparatus is the chip configured in the communication device, the communication interface may be an input/output interface.

Optionally, the transceiver may be a transceiver circuit. Optionally, the input/output interface may be an input/output circuit.

According to a tenth aspect, a processor is provided, including an input circuit, an output circuit, and a processing circuit. The processing circuit is configured to: receive a signal by using the input circuit, and transmit a signal by using the output circuit, to enable the processor to perform the method according to any one of the possible implementations of the first aspect to the fourth aspect.

In a specific implementation process, the processor may be a chip, the input circuit may be an input pin, the output circuit may be an output pin, and the processing circuit may be a transistor, a gate circuit, a trigger, various logic circuits, and the like. An input signal received by the input circuit may be received and input by, for example, but not limited to, a receiver. A signal output by the output circuit may be output to and transmitted by, for example, but not limited to, a transmitter, and the input circuit and the output circuit may be a same circuit. The circuit is separately used as an input circuit and an output circuit at different moments. Specific implementations of the processor and various circuits are not limited in this embodiment of this application.

According to an eleventh aspect, a processing apparatus is provided, and the processing apparatus includes a processor and a memory. The processor is configured to: read instructions stored in the memory, receive a signal by using a receiver, and transmit a signal by using a transmitter, to perform the method according to any one of the possible implementations of the first aspect to the fourth aspect.

Optionally, there may be one or more processors, and there may be one or more of memories.

Optionally, the memory may be integrated with the processor, or the memory and the processor are separately disposed.

In a specific implementation process, the memory may be a non-transitory (non-transitory) memory, for example, a read only memory (read only memory. ROM). The memory and the processor may be integrated on a same chip, or may be separately disposed on different chips. A type of the memory and a manner in which the memory and the processor are disposed are not limited in this embodiment of this application.

It should be understood that a related data exchange process, for example, sending indication information, may be a process of outputting the indication information from the processor, and receiving capability information, may be a process of receiving the input capability information by the processor. Specifically, data output by the processor may be output to the transmitter, and input data received by the processor may be from the receiver. The transmitter and the receiver may be collectively referred to as a transceiver.

The processing apparatus in the eleventh aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, may be located outside the processor, or may exist independently.

According to a twelfth aspect, a computer program product is provided. The computer program product includes a computer program (which may also be referred to as code or instructions). When the computer program is run, a computer is enabled to perform the method according to any one of the possible implementations of the first aspect to the fourth aspect.

According to a thirteenth aspect, a computer-readable medium is provided. The computer-readable medium stores a computer program (which may also be referred to as code or instructions). When the computer program runs on a computer, the computer is enabled to perform the method according to any one of the possible implementations of the first aspect to the fourth aspect.

According to a fourteenth aspect, a communication system is provided. The communication system includes the foregoing first device and the foregoing second device.

DESCRIPTION OF EMBODIMENTS

The following describes technical solutions of this application with reference to accompanying drawings.

The technical solutions in embodiments of this application may be applied to a wireless local area network (wireless local area network, WLAN), and the embodiments of this application may be further applied to any protocol in the international Institute of Electrical and Electronics Engineers (institute of electrical and electronics engineers, IEEE) 802.11 series protocols currently used by the WLAN, for example, may be applied to a communication system of the IEEE 802.11az protocol currently supported by the WLAN, may be applied to a communication system of a next-generation protocol supporting 802.11az, may be applied to a communication system supporting 802.11be, or may be applied to a wireless fidelity sensing (wireless fidelity sensing) communication system or another scenario in which positioning or ranging needs to be performed.

The method according to this embodiment of this application may be applied to a scenario in which an active target and a passive target are located. For example, FIG. 1 is a schematic diagram of a scenario in which a method according to an embodiment of this application is applied to locating an active target.

Figure 1:
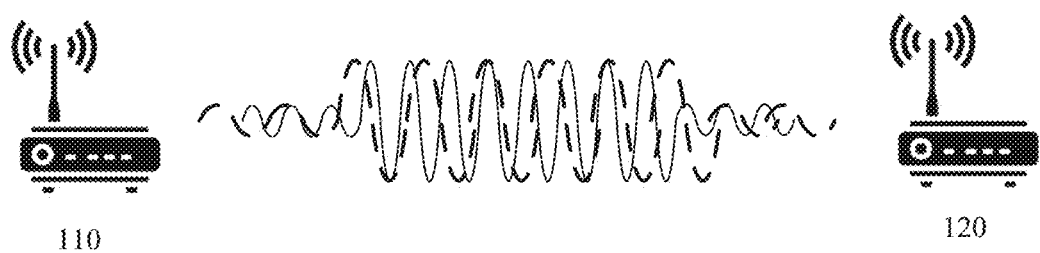
FIG. 1 is a schematic diagram of an application scenario of a method according to an embodiment of this application.

As shown in FIG. 1, both a first device 110 and a second device 120 support a multi-connection feature. In other words, both the first device 110 and the second device 120 may simultaneously work on different channels. When the first device 110 has a ranging requirement, that is, when the second device 120 needs to be located, the first device 110 may send a ranging request frame to the second device 120. The ranging request frame is used to negotiate information such as a ranging method used when the first device 110 and the second device 120 perform ranging, information about a channel on which a signal is transmitted, bandwidth of the channel, and signal duration. Correspondingly, the second device 120 may further reply, to the first device 110, information about agreeing to assist the first device 110 in performing ranging. Similarly, when the second device has a ranging requirement, that is, when the first device 110 needs to be located, the second device 120 may send a ranging request frame to the first device 110. The ranging request frame is used to negotiate information such as a ranging method used when the first device 110 and the second device 120 perform ranging, information about a channel on which a signal is transmitted, bandwidth of the channel, and signal duration. Correspondingly, the first device 110 may reply, to the second device 120, information about agreeing to assist the second device 120 in performing ranging.

The first device may be a wireless fidelity (wireless fidelity, Wi-Fi) device, a router, a terminal device, or a user station (station, STA). Alternatively, the second device may be a Wi-Fi device, a router, a terminal device, or a STA. For example, a WLAN is used as an example. The first device in this embodiment of this application may be the STA, and the second device may also be the STA. Specifically, if the first device initiates a ranging request, the first device may be an initiator station (initiator station, ISTA), and the second device may be a responder station (responder station, RSTA). If the second device initiates a ranging request, the second device may be an ISTA, and the first device may be an RSTA.

Currently, a Wi-Fi standard defines a location measurement method that is called a fine time measurement (fine time measurement, FTM) method, and a latest corresponding standard is the IEEE 801.11az. The FTM method calculates RTT of signal transmission between the two devices through interaction between the ISTA and the RSTA, and then calculates a signal propagation distance between the ISTA and the RSTA based on a propagation speed of an electromagnetic wave. When a line of sight (line of sight, LOS) exists between the ISTA and the RSTA, the signal propagation distance is a distance between the ISTA and the RSTA. When a non-line of sight (non-line of sight, NLOS) exists between the ISTA and the RSTA, the FTM method does not work.

Figure 2:
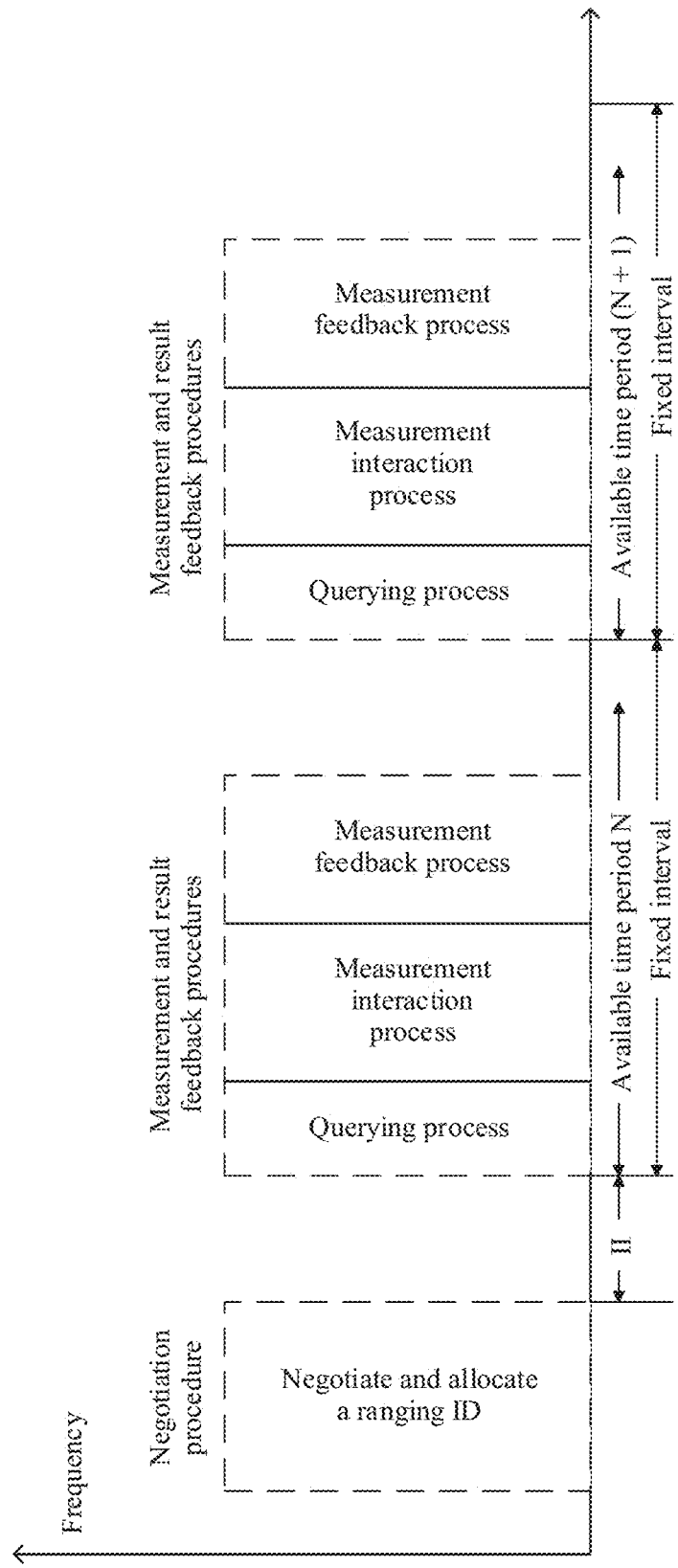
FIG. 2 is a schematic diagram of an FTM method in a TB mode.

As shown in FIG. 2, the FTM method mainly includes three procedures: a negotiation procedure, a measurement procedure, and a result feedback procedure. When having an FTM measurement requirement, the ISTA may send an FTM request frame to the RSTA. After receiving the FTM request frame, the RSTA sends information about an available time period to the ISTA. In addition, in a negotiation process, the ISTA and the RSTA also perform interaction for obtaining capabilities of each other, and the RSTA may further allocate a ranging identifier (ranging identifier, ranging ID) to the ISTA. When the ISTA and the RSTA are already associated, the RSTA does not need to allocate the ranging identifier to the ISTA, and the ISTA may directly use an association identifier (associated identifier, associated ID) between the RSTA and the ISTA. After the negotiation procedure is complete, a plurality of measurement procedures and result feedback procedures may be performed between the ISTA and the RSTA without the negotiation procedure. As shown in FIG. 2, in the negotiation procedure, the ISTA may obtain the information about the available time period of the RSTA. In an available time period N, the ISTA and the RSTA may perform the measurement procedure and the result feedback procedure for one time. In an available time period N+1, the ISTA and the RSTA may perform the measurement procedure and the result feedback procedure for another time. Duration of each available time period is the same.

Figure 3:
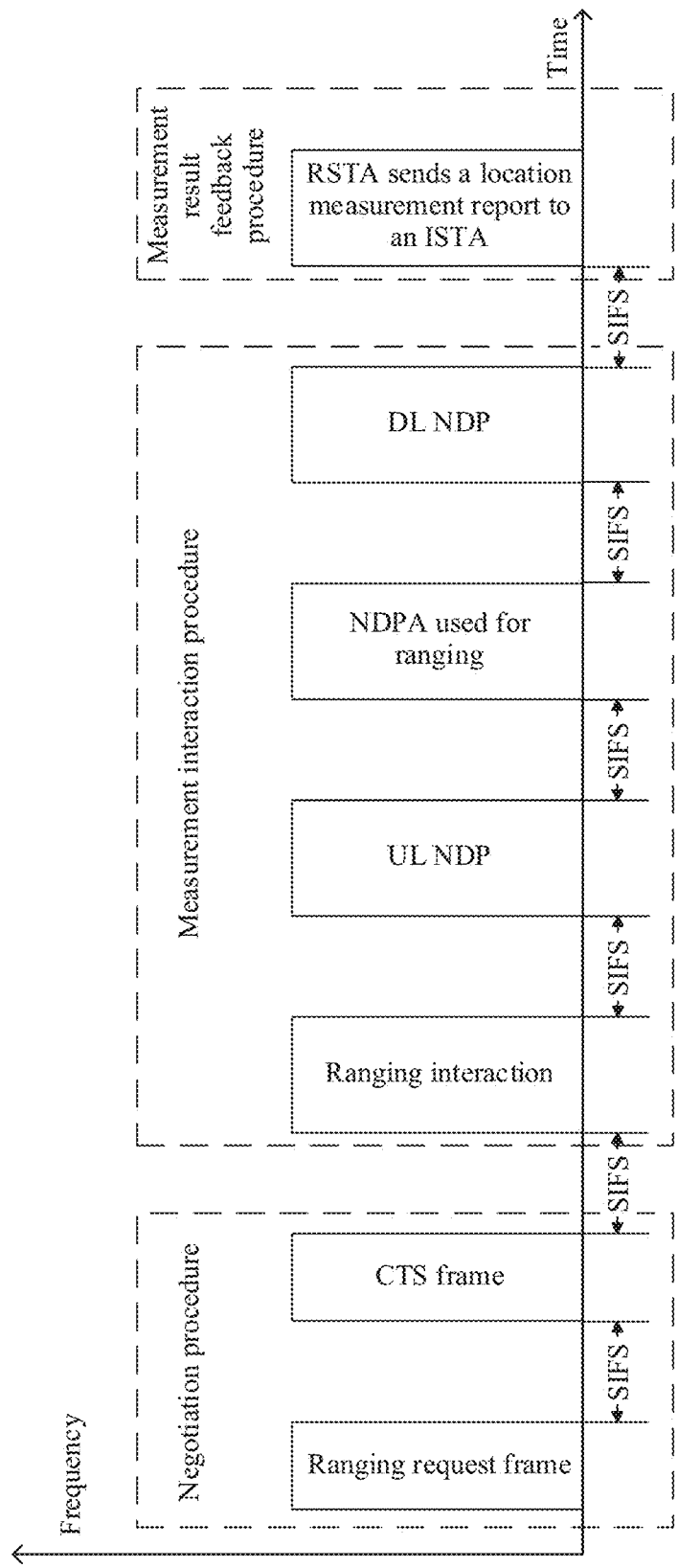
FIG. 3 is a schematic diagram of an FTM method in a TB mode.
Figure 4:
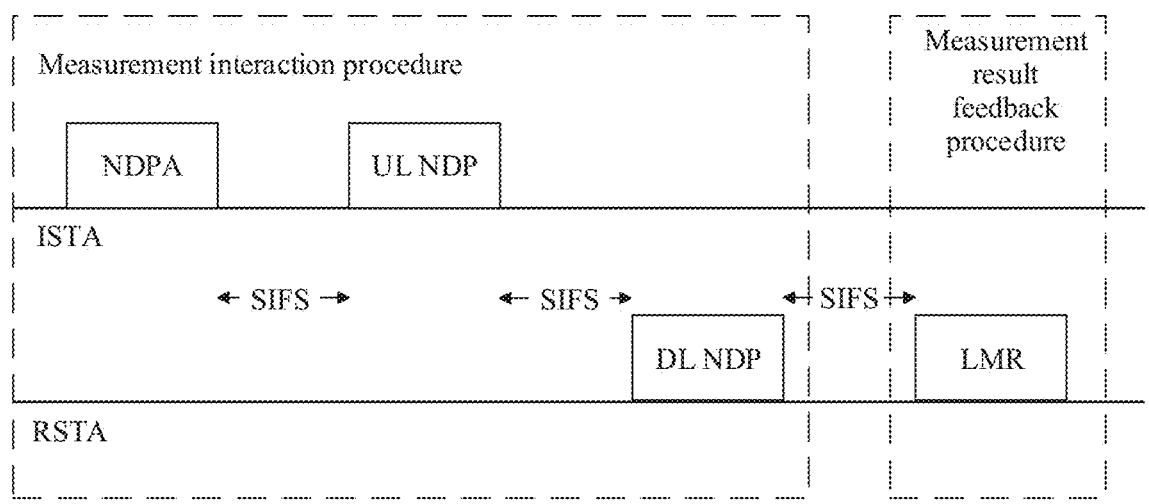
FIG. 4 is a schematic diagram of an FTM method in a non-TB mode.

A detailed interaction procedure, of an FTM protocol, in which the measurement procedure and the result feedback procedure are performed in a trigger-based (trigger-based, TB) mode is shown in FIG. 3, and a procedure, of an FTM protocol, in which the measurement procedure and the result feedback procedure are performed in a non-trigger-based (non-trigger-based, Non-TB) mode is shown in FIG. 4. As shown in FIG. 3, in the TB mode, the RSTA sends a polling frame to the ISTA in an idle time window of the RSTA A function of the polling frame is to notify the ISTA to start to perform measurement. After receiving the polling frame, the ISTA occupies a channel by sending a clear to send (clear to send, CTS) frame to the ISTA. After receiving the CTS frame, the RSTA sends, to the ISTA, a scheduling frame used for distance measurement. After receiving the scheduling frame, the ISTA returns a null data packet (null data packet, NDP) frame to the RSTA. After receiving the NDP, the RSTA sends, to the ISTA, a null data packet announcement (null data packet announcement, NDPA) frame used for ranging. After short interframe space (short interframe space, SIFS) time, the RSTA sends an NDP frame to the ISTA. After the SIFS time, the RSTA feeds back a location measurement report (location measurement report, LMR) to the ISTA. A time interval of each interaction between the ISTA and the RSTA is the SIFS time. As shown in FIG. 4, in the non-TB mode, the ISTA first sends an NDPA frame to the RSTA in the measurement procedure. After the SIFS time, the ISTA sends an uplink (uplink, UL) NDP frame to the RSTA. After receiving the NDP frame, the RSTA returns a downlink (downlink, DL) NDP frame to the ISTA after the SIFS time. After the SIFS time, the RSTA sends the LMR to the ISTA.

Figure 5:
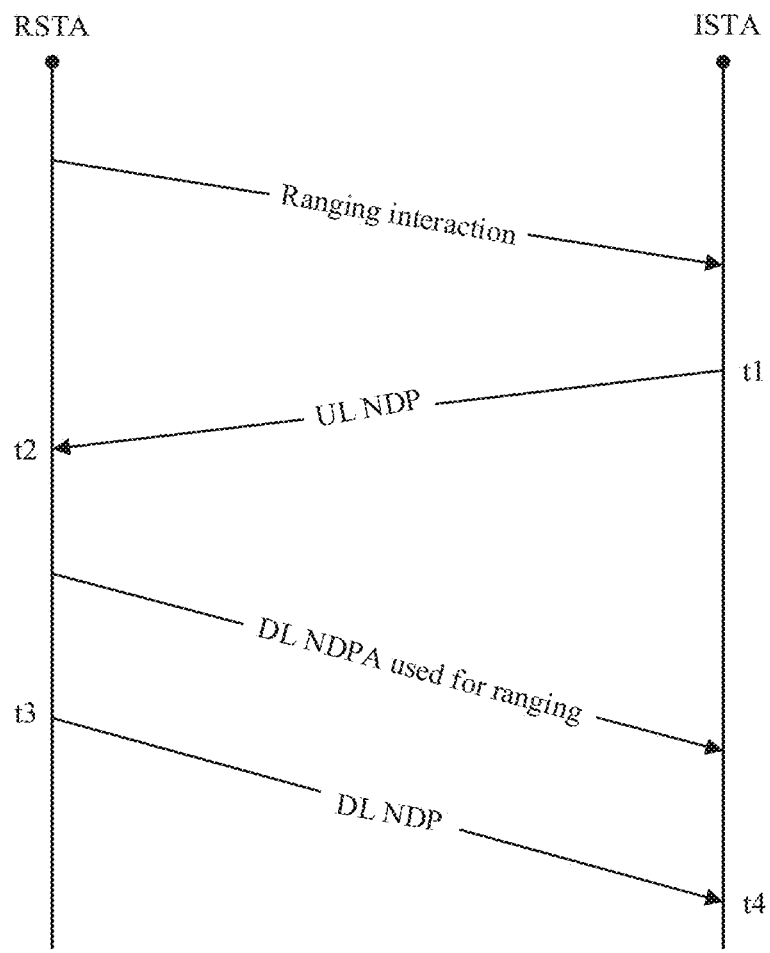
FIG. 5 is a principle diagram of an FTM method in a TB mode.
Figure 6:
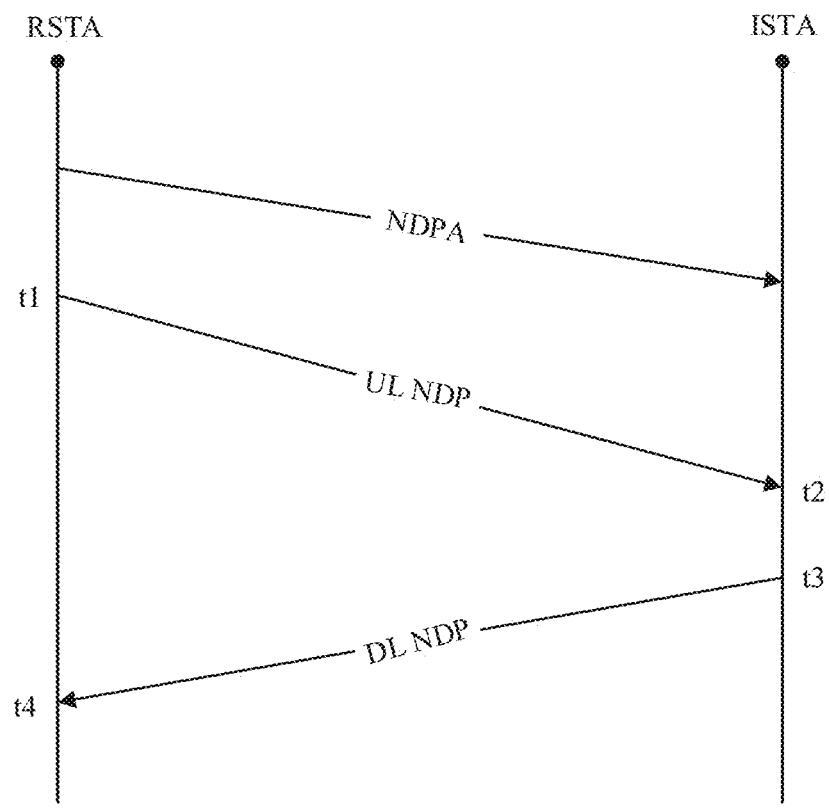
FIG. 6 is a principle diagram of an FTM method in a non-TB mode.

FIG. 5 and FIG. 6 show basic principles in which the FTM method is used for ranging. A principle of the FTM ranging in the TB mode is basically the same as a principle of the FTM ranging in the non-TB mode. Therefore, only the TB mode is used as an example for description. During the FTM ranging, both the ISTA and RSTA need to record sending time and receiving time of all NDP frames in a measurement period. As shown in FIG. 5, when the ISTA sends an UL NDP frame, the ISTA records sending time t1 of the frame. After receiving the frame, the RSTA records receiving time t2 of receiving the frame. When sending a DL NDP, the RSTA needs to record corresponding sending time t3. After receiving the DL NDP frame, the ISTA records corresponding receiving time t4. In this case, round-trip time (RTT) of signal propagation between the ISTA and the RSTA is:

$$RTT = [(t4-t1)-(t3-t2)] \quad (1).$$

In combination with the propagation speed of the electromagnetic wave, it may be obtained that a distance D between the ISTA and the RSTA is:

$$D = \frac{RTT * c}{2}, \quad (2)$$

where
c is a speed of light.

The ISTA combines FTM measurement results between the ISTA and a plurality of RSTAs, and the ISTA can also infer location information of the ISTA.

Figure 7:
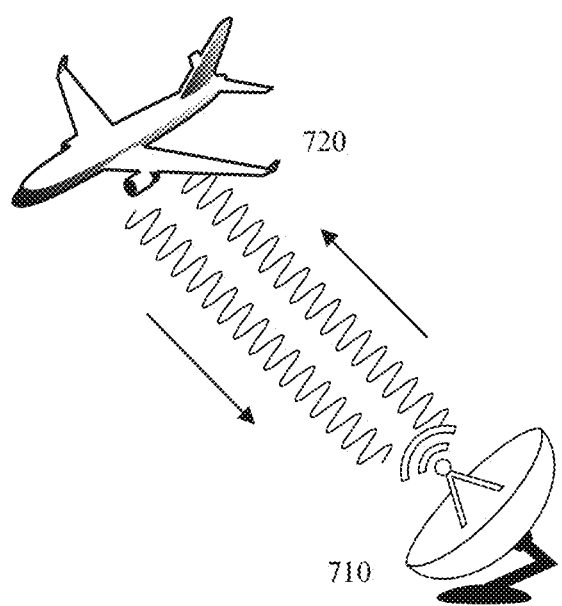
FIG. 7 is a schematic diagram of a radar system.

A currently known ranging method further includes a radar technology. As shown in FIG. 7, a basic technical principle of radar is that a radar transmitting system 710 emits a specific electromagnetic wave signal, and reflection occurs when the electromagnetic wave signal in a propagation process encounters a target obstacle 720. The radar system receives a reflected signal, compares the signal with the transmitted signal, calculates information, for example, a distance, a speed, an orientation, and the like, of the target, and even performs imaging.

As mentioned above, in the FTM method, the distance is measured by measuring propagation time of the signal between the ISTA and the RSTA. However, due to limitations of system bandwidth and an indoor multipath environment, accuracy of the measurement of the propagation time of the signal is limited, and a minor time error corresponds to a large ranging error. For example, a 10 ns time error corresponds to a 3 m distance error. Therefore, the accuracy of the distance measured by using the FTM method is not high. In addition, the FTM method requires that the ISTA interacts with the RSTA for a plurality of times to complete measurement. Therefore, a measurement process is complex and measurement efficiency is low.

Therefore, this application provides a ranging method, to improve accuracy and efficiency of measuring a distance between two devices.

The following describes in detail the method according to this embodiment of this application with reference to the accompanying drawings. For ease of description, an example in which both a first device and a second device are STAs is used for description in the embodiment shown below. However, this should not constitute a limitation on this application. The first device and the second device may alternatively be Wi-Fi devices, routers, or terminal devices. The first device and the second device may be a same type of devices, or may be different types of devices.

Figure 8:
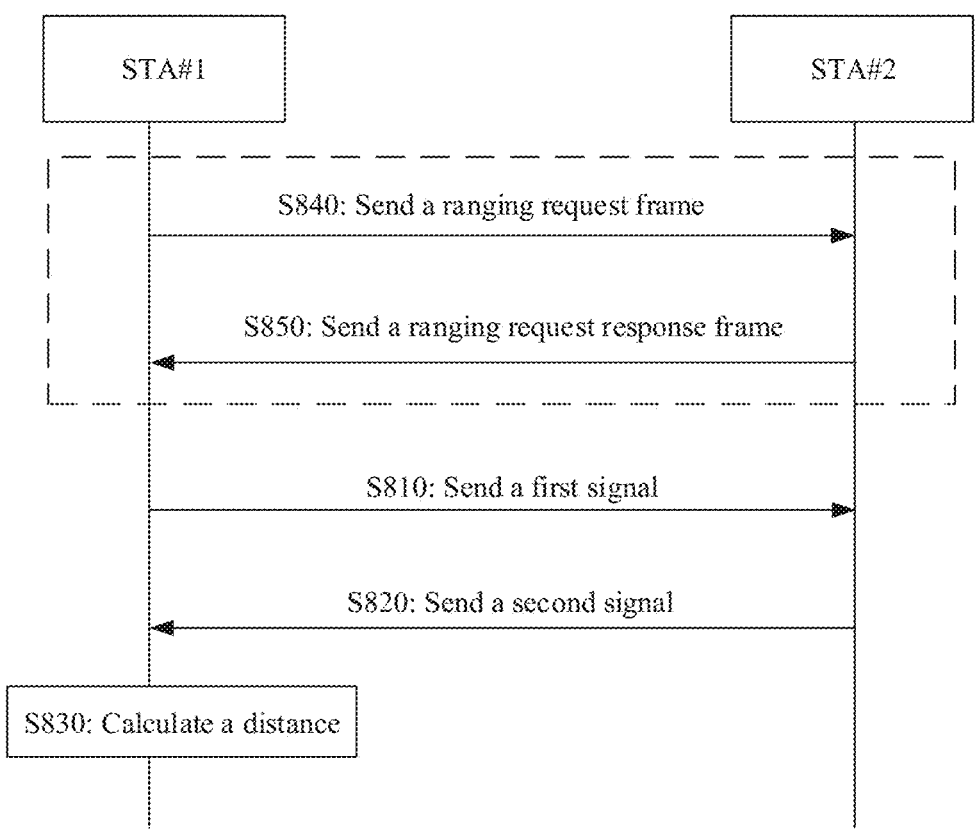
FIG. 8 is a schematic flowchart of a ranging method according to an embodiment of this application.

FIG. 8 is a schematic flowchart of a ranging method according to an embodiment of this application. The method 800 shown in FIG. 8 may be performed by the first device 110 and the second device 120 shown in FIG. 1. As shown in FIG. 8, the method 800 includes S810 to S850, and the steps are described in detail below.

S810: A STA #1 (an example of the first device) sends a first signal to a STA #2 (an example of the second device).

The STA #1 sends the first signal on a first channel.

It should be understood that, because the STA #1 does not know a location of the STA #2, the STA #1 may send the first signal in a broadcast manner.

The first signal may include a first carrier and a second carrier. The first channel may include the first carrier and the second carrier, or it may be understood that a frequency of the first carrier and a frequency of the second carrier are determined based on information about the first channel. The first channel is a channel used to transmit the first signal.

It should be noted that a form of the first signal is not limited in this embodiment of this application. For example, the first signal may be an OFDM symbol that does not include a guard interval, or the first signal may be another multicarrier signal.

For ease of understanding, in this embodiment of this application, an example in which the first signal is a first OFDM signal is used for description.

The STA #1 sends the first OFDM signal in the broadcast manner by using the first channel. The first OFDM signal is obtained by directly connecting, repeatedly for a plurality of times, long training field (long training field, LTF) symbols that do not include the guard interval. Therefore, in sending time of the first OFDM signal, each subcarrier of the first OFDM signal is a continuous monophonic signal. The first OFDM signal $S_T(t)$ may be represented as:

$$S_T(t) = \sum_{k=0}^{N-1} X(k) e^{j\frac{2\pi k}{T}t}, \ 0 \le t \le LT. \quad (3)$$

X(k) is an LTF sequence, N is a quantity of LTF sequences, and T is duration of the first OFDM signal.

Optionally, if S850 is performed in the method 800, the STA #1 sends the first OFDM signal in the broadcast manner by using the first channel in a first time period.

Optionally, the first OFDM signal sent by the STA #1 may use only some subcarriers. For example, only one subcarrier in every four subcarriers is used (for example, a 1*LTF sequence is used). Alternatively, one subcarrier in every two subcarriers is used (for example, a 2*LTF sequence is used).

S820: The STA #2 sends a second signal.

In an implementation, after receiving the first signal from the STA #1, the STA #2 changes a center frequency of the first signal by using a frequency mixer, to generate the second signal. Corresponding to that the first signal may include a first carrier and a second carrier, the second signal may include a third carrier and a fourth carrier. A second channel may include the third carrier and the fourth carrier. That the STA #2 changes the center frequency of the first signal may also be understood as that the STA #2 changes frequencies of the first carrier and the second carrier, to generate the third carrier and the fourth carrier. It may be understood that frequencies of the third carrier and the fourth carrier are determined based on information about the second channel. The second channel is used to transmit the second signal.

In another implementation, after receiving the first signal from the STA #1, the STA #2 changes a center frequency of the first signal by using a frequency mixer, and amplifies power of the first signal by using a power amplifier, to generate the second signal. Corresponding to that the first signal may include a first carrier and a second carrier, the second signal may include a third carrier and a fourth carrier. A second channel may include the third carrier and the fourth carrier. That the STA #2 changes the center frequency of the first signal may also be understood as that the STA #2 changes frequencies of the first carrier and the second carrier, to generate the third carrier and the fourth carrier. It may be understood that frequencies of the third carrier and the fourth carrier are determined based on information about a second channel. The second channel is used to transmit the second signal. A change amount, of power of the second signal, relative to the power of the first signal is also determined based on the information of the second channel.

Then, the STA #2 sends the second signal on the second channel.

It should be understood that, because the STA #2 does not know a location of the STA #1, the STA #2 may send the second signal in the broadcast manner.

For example, the first signal sent by the STA #1 is the first OFDM signal. The second OFDM signal $S_R(t)$ generated after the STA #2 performs frequency conversion on the first OFDM signal may be represented as:

$$S_R(t) = \sum_{k=0}^{N-1} X(k) e^{j\frac{2\pi k}{T}\left(t-\frac{2d}{c}\right)+\varphi_k}, \ 0 \le t \le LT, \quad (4)$$

where d is a distance between the STA #1 and the STA #2, c is a speed of light, and $\varphi_u$ is a phase shift caused by performing frequency conversion for a plurality of times.

Figure 9:
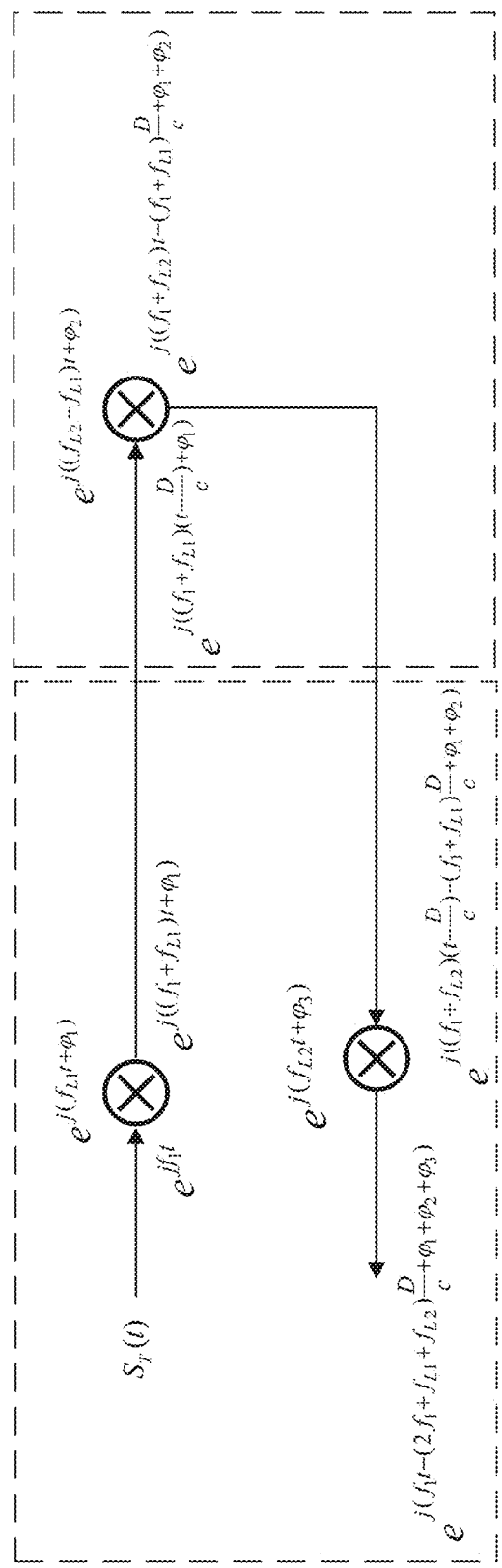
FIG. 9 is a processing procedure of a signal used for ranging.

As shown in FIG. 9, an initial sampling signal is $e^{jf_1 t}$, and the first signal obtained after the STA #1 performs frequency conversion on the sampling signal based on the information about the first channel is $e^{j((f_1+f_{L1})t+\varphi_u)}$. Then, the second signal obtained after the STA #2 performs frequency conversion on the first information based on the information about the second channel is $$e^{j\left((f_1+f_{L2})t-(f_1+f_{L1})\frac{D}{c}+\varphi_1+\varphi_2\right)}.$$

Then, a signal obtained after the STA #1 performs frequency conversion on the received second signal based on a processing capability of a baseband is $$e^{j\left(f_1 t-(2f_1+f_{L1}+f_{L2})\frac{D}{c}+\varphi_1+\varphi_2+\varphi_3\right)}.$$

Therefore, it can be learned that, in a ranging process, the caused phase shift $\varphi_u$ is $\varphi_1+\varphi_2+\varphi_3$.

S830: The STA #1 calculates the distance between the STA #1 and the STA #2.

The STA #1 calculates the distance between the STA #1 and the STA #2 based on a phase difference between carriers of the second signal. For example, the STA #1 may calculate the distance between the STA #1 and the STA #2 based on a phase difference between the third carrier and the fourth carrier in the second signal.

An example in which the first signal is the first OFDM signal is used for description. Correspondingly, the second signal received by the STA #1 is the second OFDM signal.

It can be learned from the formula (4) that a phase P(k) of channel state information of a $k^{th}$ subcarrier in the second OFDM signal received by the STA #1 may be represented as:

$$P(k) = -\frac{4\pi kd}{Tc} + \varphi_u. \quad (5)$$

Therefore, a phase difference $\Delta\varphi$ of channel state information of two adjacent subcarriers may be represented as:

$$\Delta\varphi = P(k-1) - P(k) = \frac{4\pi d}{Tc}. \quad (6)$$

Therefore, the distance d between the STA #1 and the STA #2 may be represented as:

$$d = \frac{Tc\Delta\varphi}{4\pi} = \frac{c}{4\pi\Delta f}\Delta\varphi, \quad (7)$$

where $\Delta f$ is a frequency spacing between the two adjacent subcarriers.

Optionally, before S810, the STA #1 may interact with the STA #2 to negotiate the information about the first channel and the information about the second channel that are used for subsequent ranging. Alternatively, the STA #1 may send, in the broadcast manner, the information about the first channel and the information about the second channel that are used for subsequent ranging. Alternatively, the STA #2 may send, in the broadcast manner, the information about the first channel and the information about the second channel that are used for subsequent ranging.

An example in which the STA #1 interacts with the STA #2 to negotiate the information about the first channel and the information about the second channel is used. The method 800 may further include S840 and S850.

S840: The STA #1 sends a ranging request frame.

It should be understood that, because the STA #1 does not know the location of the STA #2, the STA #1 may send the ranging request frame in the broadcast manner.

The ranging request frame may include the information about the first channel and the information about the second channel. The information about the first channel may include at least one piece of the following information: bandwidth of the first channel, a frequency channel number of the first channel, and a channel number of the first channel. The information about the second channel includes at least one piece of the following information: bandwidth of the second channel, a frequency channel number of the second channel, and a channel number of the second channel.

Optionally, the ranging request frame may further carry at least one piece of the following information: ranging method information and duration information of the first signal.

S850: The STA #2 sends a ranging request response frame.

After the STA #2 receives the ranging request frame from the STA #1, the STA #2 may return the ranging request response frame to the STA #1.

It should be understood that, because the STA #2 does not know the location of the STA #1, the STA #2 may send the ranging request response frame in the broadcast manner.

In other words, if the STA #2 can support the ranging request of the STA #1, the STA #2 returns the ranging request response frame to the STA #1. The ranging request response frame may include information about an available ranging time period, and the information about an available ranging time period is used to indicate the first time period.

Optionally, after receiving the ranging request frame of the STA #1, the STA #2 may first send an acknowledgment (acknowledgment, ACK) frame to the STA #1 after SIFS time. Then, the STA #2 parses the information carried in the ranging request frame, and if the STA #2 can support the ranging request of the STA #1, the STA #2 returns the ranging request response frame to the STA #1.

Optionally, after receiving the ranging request response frame from the STA #2, the STA #1 may also send an ACK frame to the STA #2 after SIFS time.

S840 and S850 show a process of negotiating the information about the first channel and the information about the second channel only by using an example in which the STA #1 interacts with the STA #2. However, this should not constitute a limitation on this application.

Figure 10:
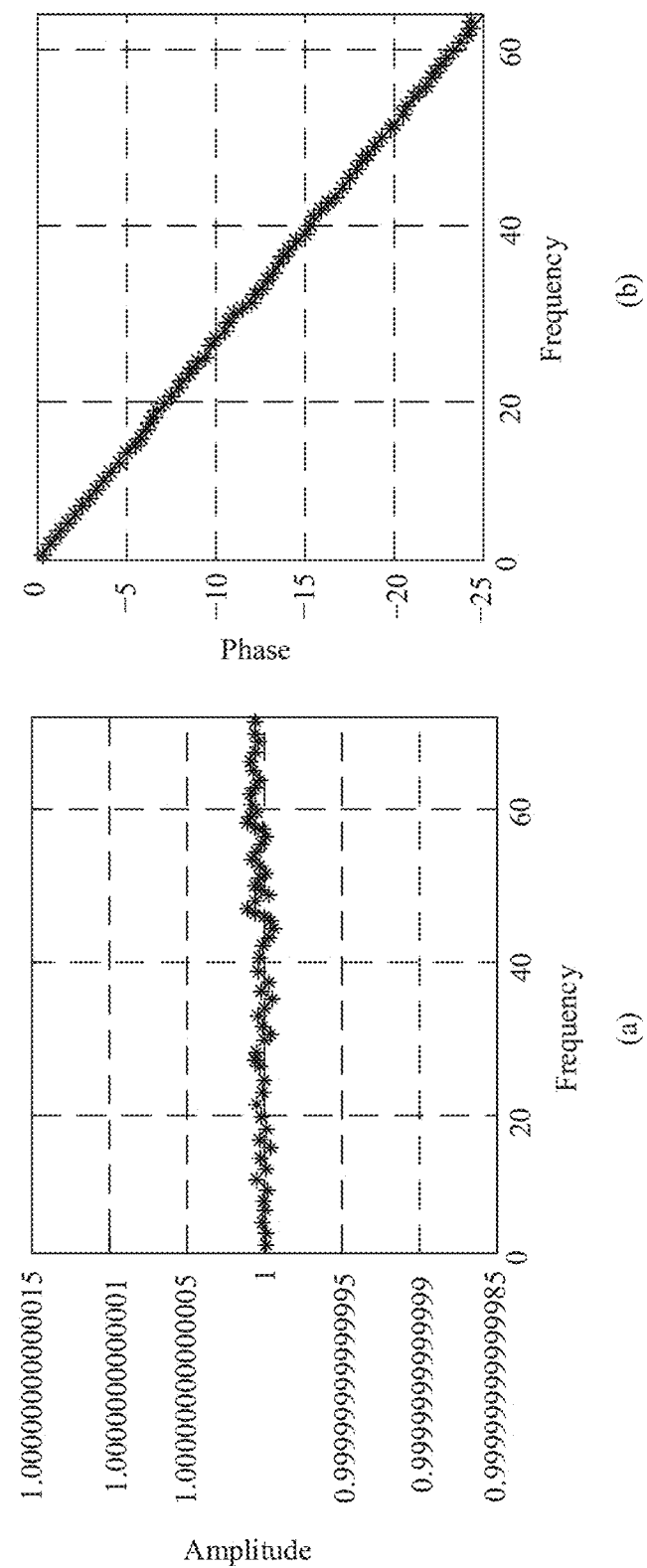
FIG. 10 is a diagram of a relationship between amplitude and a phase, of CSI, obtained through measurement without a multipath condition, and a subcarrier frequency.
Figure 11:
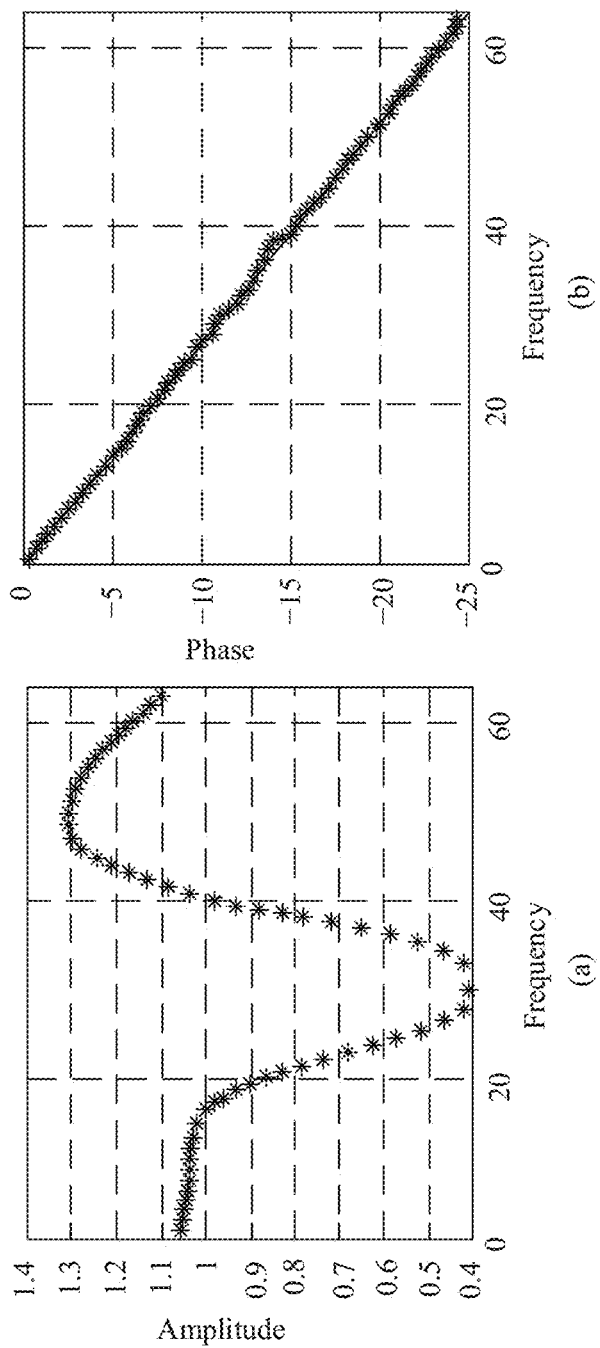
FIG. 11 is a diagram of a relationship between amplitude and a phase of CSI, obtained through measurement with a multipath condition, and a subcarrier frequency.

FIG. 10 and FIG. 11 separately show a simulation result between amplitude and a phase, of channel state information (channel state information, CSI), obtained through measurement without a multipath condition and a simulation result between amplitude, and a phase and a frequency, of channel state information (CSI), obtained through measurement with a multipath condition. As shown in (b) of FIG. 10 and (b) of FIG. 11, whether there is no multipath condition or there is the multipath condition, the phase of the CSI is approximately linearly related to a frequency of a carrier, and a slope of the linear relationship determines a ranging result. It can be learned that calculating a distance between two devices based on a phase difference between different carriers is not limited by an indoor multipath environment. As shown in (a) of FIG. 10, when there is no multipath condition, the amplitude of the CSI basically does not change with a frequency of the carrier. As shown in (a) of FIG. 11, when there is the multipath condition, the amplitude of the CSI significantly changes with a frequency of the carrier. Therefore, it can be learned that, when there is the multipath condition, a large error is generated when the distance between the two devices is calculated by measuring transmission time of a signal.

Therefore, in this embodiment of this application, the STA #1 calculates the distance between the STA #1 and the STA #2 by measuring the phase difference between the carriers of the second signal actively reflected by the STA #2. This implements high-accuracy measurement of the distance between the devices. High measurement accuracy can be ensured even when there is the multipath condition. In addition, when the method in this embodiment of this application is used for ranging, two user equipments do not need to interact with each other for a plurality of times. This improves ranging efficiency. When the first signal and the second signal are transmitted on different channels, interference between the signals can be further avoided. This ensures high ranging accuracy.

In addition, because the first signal sent by the STA #1 may use only some carriers, transmit power of the used carriers may be increased when total transmit power remains unchanged, so that a maximum ranging range can be extended.

Figure 12:
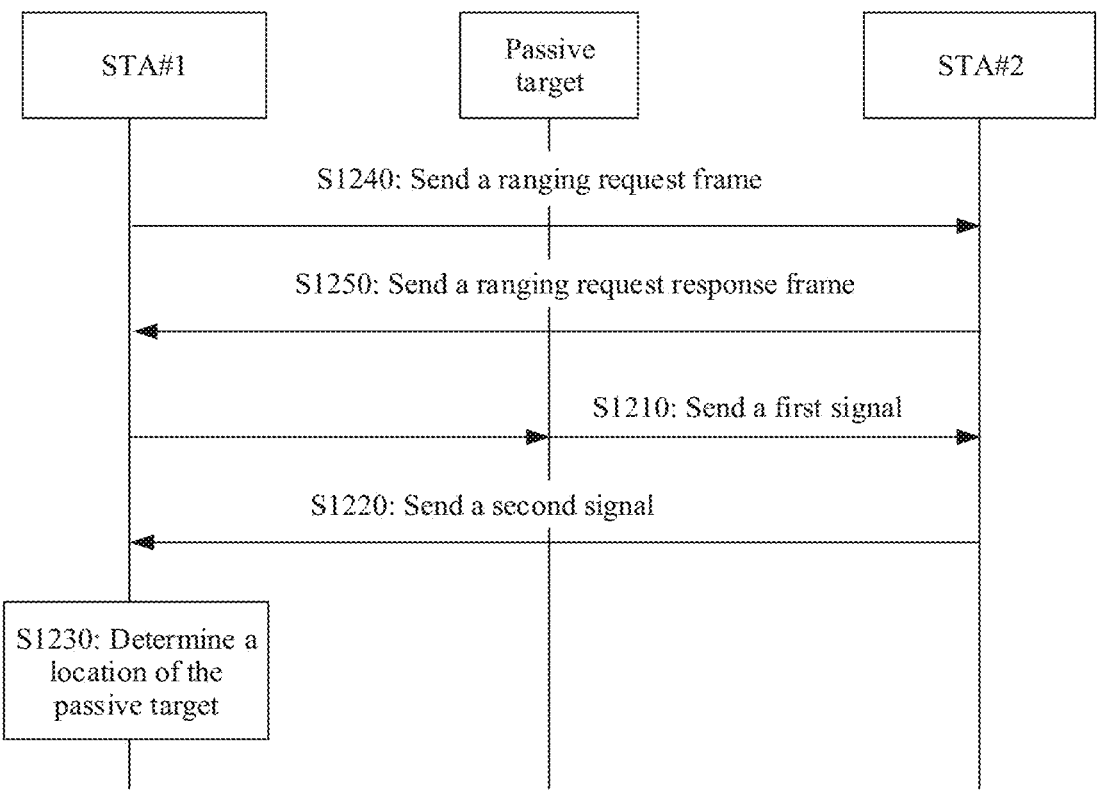
FIG. 12 is a schematic flowchart of a ranging method according to an embodiment of this application.

FIG. 12 is a schematic flowchart of a ranging method according to another embodiment of this application. The method 1200 shown in FIG. 12 may be performed by the first device 110 and the second device 120 shown in FIG. 1. The method 1200 includes S1210 to S1250. S1240 and S1250, and S1220 are the same as S840 and S850, and S820 in the method 800. For brevity, details are not described herein again.

S1210: A STA #1 (an example of the first device) sends a first signal to a passive target, and then the passive target reflects the first signal to a STA #2 (an example of the second device).

It should be understood that the STA #I does not know a specific direction of the passive target. Therefore, the STA #1 sequentially sends the first signal in different directions.

For example, the first signal is a first OFDM signal. As described above, the STA #1 sends the first OFDM signal to the passive target on a first channel, and the first OFDM signal $S_T(t)$ may be represented as:

$$S_T(t) = \sum_{k=0}^{N-1} X(k) e^{j\frac{2\pi k}{T}t}, 0 \le t \le LT. \qquad (3)$$

S1230: The STA #1 determines a location of the passive target.

As described above, the STA #1 sequentially sends the first signal in different directions. If the STA #1 receives, after sending the first signal in a direction, a second signal that is reflected by the passive target to the STA #2 and that is sent back after being processed by the STA #2, the STA #1 may determine the direction, of the passive target, relative to the STA #1.

Further, the STA # calculates a sum of a distance between the passive target and the STA #1 and a distance between the passive target and the STA #2 based on a phase difference between two carriers of the second signal.

For example, the first signal is the first OFDM signal. As described above, a second OFDM signal $S_R(\ )$ generated after the STA #2 performs frequency conversion on the first OFDM signal may be represented as:

$$S_R(t) = \sum_{k=0}^{N-1} X(k)^{j\frac{2\pi k}{T}\left(t-\frac{D}{c}\right)+\varphi u}, 0 \le t \le LT, \quad (8)$$

where

D is a signal propagation distance. It can be learned that, in a ranging process, the signal propagation distance is a sum of the distance between the passive target and the STA #1, the distance between the passive target and the STA #2, and a distance between the STA #1 and the STA #2. The distance d between the STA #1 and the STA #2 may be measured by using the method 800.

Therefore, it may be calculated that the sum of the distance between the passive target and the STA #1 and the distance between the passive target and the STA #2 is D–d.

Figure 13:
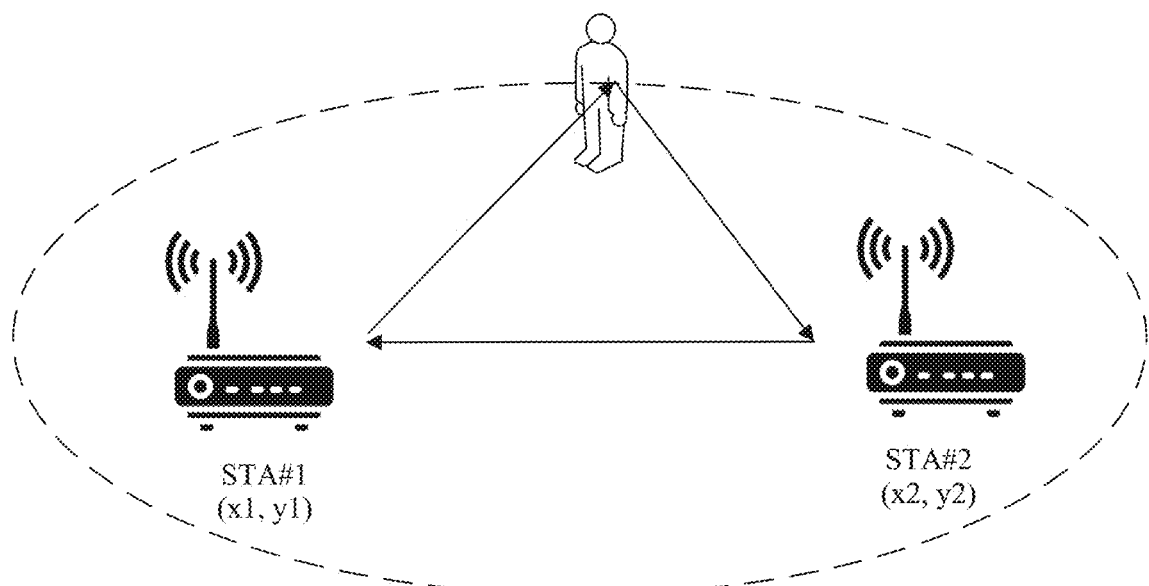
FIG. 13 is a schematic diagram of a ranging method according to an embodiment of this application.

As shown in FIG. 13, it is assumed that a location of the STA #1 is represented as $(x_1, y_1)$, and a location of the STA #2 is represented as $(x_2, y_2)$. It may be learned that the passive target is on an ellipse whose focuses are $(x_1, y_1)$ and $(x_2, y_2)$, and whose major axis diameter is D–d. Then, a ray is drawn, in a direction in which the STA #1 sends the first OFDM signal, by using the location $(x_1, y_1)$ of the STA #1 as an endpoint. An intersection point of the ray and the ellipse is the specific location of the passive target.

In this embodiment of this application, with cooperation between the two active devices, the STA #1 may determine the location of the passive target based on the distance obtained by calculating the phase difference between the two carriers of the second signal actively reflected by the STA #2 and the direction in which the STA #1 sends the first signal.

Figure 14:
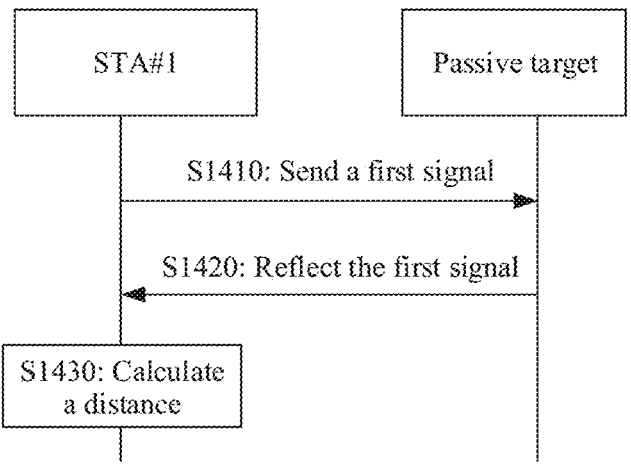
FIG. 14 is a schematic flowchart of a ranging method according to an embodiment of this application.

FIG. 14 is a schematic flowchart of a ranging method according to another embodiment of this application. The method 1400 shown in FIG. 14 may be performed by the first device 110 or the second device 120 shown in FIG. 1. The method 1400 includes S1410 to S1430, and the steps are described in detail below.

S1410: A STA #1 sends a first signal to a passive target on a first channel.

The first signal may include two carriers, and the two carriers correspond to the first channel. It may also be understood that frequencies of the two carriers are determined based on information about the first channel.

It should be understood that the STA #1 does not know a specific direction of the passive target. Therefore, the STA #1 sequentially sends the first signal in different directions.

S1420: The STA #1 receives, on the first channel, the first signal reflected by the passive target.

S1430: The STA #1 calculates a distance between the passive target and the STA #1.

After receiving the first signal reflected by the passive target, the STA #1 may first eliminate, by using a full-duplex technical means, influence of the first signal reflected by the passive target, to obtain a pure reflected signal.

Then, the STA #1 calculates the distance between the passive target and the STA #1 based on a phase difference between carriers of the first signal reflected by the passive target. A specific location of the passive target may be determined with reference to the direction of the previously sent first signal.

In this embodiment of this application, when no other device can cooperate with the first device, the first device may alternatively determine the location of the passive target based on the phase difference between the carriers of the first signal reflected by the passive target.

The methods according to the embodiments of this application are described above in detail with reference to FIG. 8 to FIG. 14. The apparatuses according to the embodiments of this application are described below in detail with reference to FIG. 15 and FIG. 16.

Figure 15:
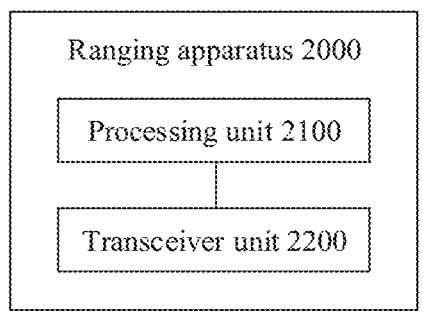
FIG. 15 is a schematic block diagram of a ranging apparatus according to an embodiment of this application.

FIG. 15 is a schematic block diagram of a ranging apparatus according to an embodiment of this application. As shown in FIG. 15, the ranging apparatus 2000 may include, for example, a processing unit 2100 and a transceiver unit 2200.

In a possible design, the ranging apparatus 2000 may correspond to the first device in the foregoing method embodiment, for example, may be the first device or a component (for example, a chip or a chip system) configured in the first device.

It should be understood that the ranging apparatus 2000 may correspond to the first device in the method 800, the method 1200, and the method 1400 according to the embodiments of this application. The ranging apparatus 2000 may include units configured to perform methods performed by the first device in the method 800 in FIG. 8, the method 1200 in FIG. 12, and the method 1400 in FIG. 14. In addition, the units in the ranging apparatus 2000 and the foregoing other operations and/or functions are separately intended to implement corresponding procedures of the method 800 in FIG. 8, the method 1200 in FIG. 12, and the method 1400 in FIG. 14.

When the ranging apparatus 2000 is configured to perform the method 800 in FIG. 8, the processing unit 2100 may be configured to perform step S830 in the method 800, and the transceiver unit 2200 may be configured to perform S810 and S820, and S840 and S850 in the method 800. It should be understood that a specific process in which the units perform the foregoing corresponding steps is described in detail in the foregoing method embodiments. For brevity, details are not described herein again.

When the ranging apparatus 2000 is configured to perform the method 1200 in FIG. 12, the processing unit 2100 may be configured to perform step S1230 in the method 800, and the transceiver unit 2200 may be configured to perform S1210 and S1220, and S1240 and S1250 in the method 1200. It should be understood that a specific process in which the units perform the foregoing corresponding steps is described in detail in the foregoing method embodiments. For brevity, details are not described herein again.

When the ranging apparatus 2000 is configured to perform the method 1400 in FIG. 14, the processing unit 2100 may be configured to perform step S1430 in the method 800, and the transceiver unit 2200 may be configured to perform S1410 and S1420 in the method 1400. It should be understood that a specific process in which the units perform the foregoing corresponding steps is described in detail in the foregoing method embodiments. For brevity, details are not described herein again.

It should be further understood that, when the ranging apparatus 2000 is the chip or the chip system configured in the first device, the transceiver unit 2200 in the ranging apparatus 2000 may be implemented by using an input/output interface. The processing unit 2100 in the ranging apparatus 2000 may be implemented by using a processor, a microprocessor, an integrated circuit, or the like integrated into the chip or the chip system.

In another possible design, the ranging apparatus 2000 may correspond to the second device in the foregoing method embodiment, for example, may be the second device or a component (for example, a chip or a chip system) configured in the second device.

It should be understood that the ranging apparatus 2000 may correspond to the second device in the method 800 and the method 1200 according to the embodiments of this application. The ranging apparatus 2000 may include units configured to perform methods performed by the second device in the method 800 in FIG. 8 and the method 1200 in FIG. 12 In addition, the units in the ranging apparatus 2000 and the foregoing other operations and/or functions are separately intended to implement corresponding procedures of the method 800 in FIG. 8 and the method 1200 in FIG. 12.

When the ranging apparatus 2000 is configured to perform the method 800 in FIG. 8, the processing unit 2100 may be configured to perform step S820 in the method 800, and the transceiver unit 2200 may be configured to perform S810 and S820, and S840 and S850 in the method 800. It should be understood that a specific process in which the units perform the foregoing corresponding steps is described in detail in the foregoing method embodiments. For brevity, details are not described herein again.

When the ranging apparatus 2000 is configured to perform the method 1200 in FIG. 12, the processing unit 2100 may be configured to perform step S1220 in the method 800, and the transceiver unit 2200 may be configured to perform S1210 and S1220, and S1240 and S1250 in the method 800. It should be understood that a specific process in which the units perform the foregoing corresponding steps is described in detail in the foregoing method embodiments. For brevity, details are not described herein again.

It should be further understood that, when the ranging apparatus 2000 is the chip or the chip system configured in the second device, the transceiver unit 2200 in the ranging apparatus 2000 may be implemented by using an input/output interface. The processing unit 2100 in the ranging apparatus 2000 may be implemented by using a processor, a microprocessor, an integrated circuit, or the like integrated into the chip or the chip system.

Figure 16:
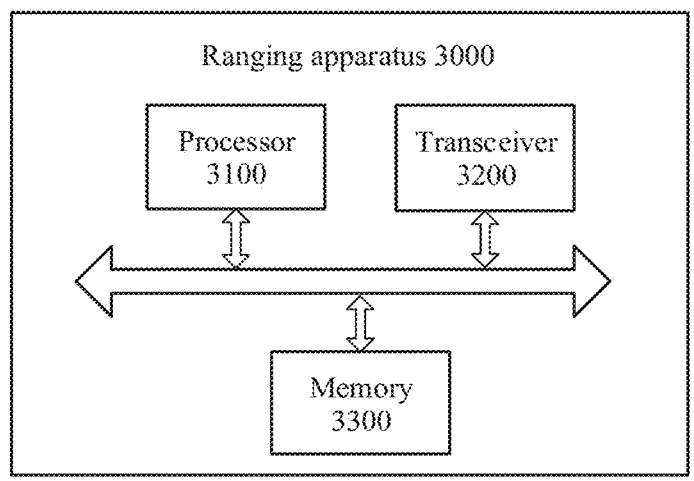
FIG. 16 is a schematic block diagram of a ranging apparatus according to an embodiment of this application.

FIG. 16 is a schematic block diagram of a ranging apparatus 3000 according to an embodiment of this application. The ranging apparatus 3000 may be applied to the system shown in FIG. 1, to perform a function of the first device or the second device in the foregoing method embodiment. As shown in FIG. 16, the ranging apparatus 3000 includes a processor 3100 and a transceiver 3200. The processor 3100 is connected to the transceiver 3200. Optionally, the ranging apparatus 3000 further includes a memory 3300, and the memory 3300 is connected to the processor 3100. The processor 3100, the memory 3300, and the transceiver 3200 may communicate with each other by using an internal connection path.

The processor 3100 may be configured to perform an action that is implemented internally by the first device and that is described in the foregoing method embodiment, for example, calculating the distance. The transceiver 3200 may be configured to perform the sending or receiving action of the first device described in the foregoing method embodiment, for example, sending the first signal, receiving the second signal, and the like. For details, refer to the description in the foregoing method embodiment. Details are not described herein again.

It should be understood that the ranging apparatus 3000 shown in FIG. 16 can implement processes related to the first device in the method embodiments shown in FIG. 8, FIG. 12, and FIG. 14. The operations and/or the functions of the modules in the ranging apparatus 3000 are intended to implement corresponding procedures in the foregoing method embodiment. For details, refer to the description in the foregoing method embodiment. To avoid repetition, detailed description is properly omitted herein.

The processor 3100 may be configured to perform an action that is implemented internally by the second device and that is described in the foregoing method embodiment, for example, performing frequency conversion on the first signal. The transceiver 3200 may be configured to perform the sending or receiving action of the second device described in the foregoing method embodiment, for example, sending the second signal, receiving the first signal, and the like. For details, refer to the description in the foregoing method embodiment. Details are not described herein again.

It should be understood that the ranging apparatus 3000 shown in FIG. 16 can implement processes related to the second device in the method embodiments shown in FIG. 8 and FIG. 12. The operations and/or the functions of the modules in the ranging apparatus 3000 are intended to implement corresponding procedures in the foregoing method embodiment. For details, refer to the description in the foregoing method embodiment. To avoid repetition, detailed description is properly omitted herein.

An embodiment of this application further provides a processing apparatus, including a processor and an interface. The processor is configured to perform the method in any one of the foregoing method embodiments.

It should be understood that, the processing apparatus may be one or more chips. For example, the processing apparatus may be a field programmable gate array (field programmable gate array, FPGA), an application-specific integrated circuit (application-specific integrated circuit, ASIC), a system on chip (system on chip, SoC), a central processing unit (central processing unit, CPU), a network processor (network processor, NP), a digital signal processor (digital signal processor, DSP), a micro controller unit (micro controller unit, MCU), or a programmable logic device (programmable logic device, PLD) or another integrated chip. In an implementation process, the steps in the foregoing methods may be completed by using a hardware integrated logic circuit in the processor, or by using instructions in a form of software. The steps of the method disclosed with reference to the embodiments of this application may be directly performed by a hardware processor, or may be performed by using a combination of hardware and software modules in the processor. The software module may be located in a mature storage medium in the art, for example, a random access memory, a flash memory, a read-only memory, a programmable read-only memory, an electrically erasable programmable memory, a register, or the like. The storage medium is located in the memory, and the processor reads information in the memory and implements the step in the foregoing method in combination with hardware of the processor. To avoid repetition, details are not described herein again.

It should be noted that the processor in the embodiment of this application may be an integrated circuit chip, and has a signal processing capability. In an implementation process, the steps in the foregoing method embodiments may be completed by using a hardware integrated logic circuit in the processor or instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed with reference to the embodiments of this application. The general-purpose processor may be a microprocessor, or the processor may be any conventional processor or the like. Steps of the methods disclosed with reference to the embodiments of this application may be directly performed by a hardware decoding processor, or may be performed by using a combination of hardware and software modules in the decoding processor. The software module may be located in a mature storage medium in the art, for example, a random access memory, a flash memory, a read-only memory, a programmable read-only memory, an electrically erasable programmable memory, a register, or the like. The storage medium is located in the memory, and the processor reads information in the memory and implements the step in the foregoing method in combination with hardware of the processor.

It may be understood that the memory in the embodiments of this application may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. Through examples but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memories in the systems and method described in this specification include but are not limited to these memories and any memory of another suitable type.

According to the methods provided in the embodiments of this application, this application further provides a computer program product. The computer program product includes computer program code. When the computer program code is run on a computer, the computer is enabled to separately perform the method performed by the first device and the method performed by the second device that are in the embodiments shown in FIG. 8, FIG. 12, and FIG. 14.

According to the methods provided in the embodiments of this application, this application further provides a computer-readable medium. The computer-readable medium stores program code. When the program code is run on a computer, the computer is enabled to separately perform the method performed by the first device and the method performed by the second device that are in the embodiments shown in FIG. 8, FIG. 12, and FIG. 14.

According to the methods provided in the embodiments of this application, this application further provides a system. The system includes the foregoing one or more first devices and the foregoing one or more second devices.

The first device and the second device in the foregoing apparatus embodiments completely correspond to the first device and the second device in the method embodiments. A corresponding module or unit performs a corresponding step. For example, the transceiver unit (transceiver) performs a receiving or sending step in the method embodiments, and a step other than the sending step and the receiving step may be performed by the processing unit (processor). For a function of a specific unit, refer to a corresponding method embodiment. There may be one or more processors.

A person of ordinary skill in the art may be aware that, various illustrative logical blocks (illustrative logical block) and steps (step) that are described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed systems, apparatuses, and methods may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium, for example, a USB flash drive, a removable hard disk, a read-only memory (read-only memory, ROM), a random access memory (random access memory, RAM), a magnetic disk, an optical disc, or the like that can store program code.

What is claimed is:

1. A ranging apparatus, comprising:
   at least one processor, and
   one or more non-transitory memories including computer-executable instructions that, when executed by the at least one processor, cause the ranging apparatus to:
   send a ranging request frame, wherein the ranging request frame comprises information about a first channel and information about a second channel, and wherein the ranging request frame further carries at least one piece of the following information:
   duration information of a first signal and ranging method information;
   receive a ranging request response frame from a second device, wherein the ranging request response frame is sent by the second device based on the ranging request frame, the ranging request response frame comprises information about an available ranging time period, and the information about the available ranging time period indicates a first time period;
   send the first signal on the first channel in the first time period;
   receive, on the second channel, a second signal from the second device, wherein the second signal is a signal obtained after frequency conversion is performed on the first signal; and
   calculate a distance between the ranging apparatus and the second device based on a phase difference between carriers of the second signal.

2. A ranging apparatus, comprising:
   at least one processor, and
   one or more non-transitory memories including computer-executable instructions that, when executed by the at least one processor, cause the ranging apparatus to:
   send a first signal to a passive target on a first channel;
   receive, on a second channel, a second signal from a second device, wherein the second signal is a signal obtained after frequency conversion is performed on the first signal;
   calculate a sum of a distance between the passive target and the ranging apparatus and a distance between the passive target and the second device based on a phase difference between carriers of the second signal; and
   determine a location of the passive target based on a transmit direction of the first signal and the sum of the distance between the passive target and the ranging apparatus and the distance between the passive target and the second device based on the phase difference between the carriers of the second signal.

3. The ranging apparatus according to claim 2, wherein the computer-executable instructions, when executed by the at least one processor, further cause the ranging apparatus to:
   send a ranging request frame, wherein the ranging request frame comprises information about the first channel and information about the second channel.

4. The ranging apparatus according to claim 3, wherein the computer-executable instructions, when executed by the at least one processor, further cause the ranging apparatus to:
   receive a ranging request response frame from the second device, wherein the ranging request response frame is sent by the second device based on the ranging request frame, the ranging request response frame comprises information about an available ranging time period, and the information about the available ranging time period indicates a first time period; and
   send the first signal on the first channel in the first time period.

5. The ranging apparatus according to claim 4, wherein the ranging request frame further carries at least one piece of the following information: duration information of the first signal and ranging method information.

6. The ranging apparatus according to claim 5, wherein the information about the first channel comprises at least one piece of the following information:
   bandwidth of the first channel, a frequency channel number of the first channel, and a channel number of the first channel; and
   information about the second channel comprises at least one piece of the following information:
   bandwidth of the second channel, a frequency channel number of the second channel, and a channel number of the second channel.

7. The ranging apparatus according to claim 6, wherein the first signal comprises at least one orthogonal frequency division multiplexing (OFDM) symbol, and the OFDM symbol does not comprise a guard interval.

8. A ranging apparatus, comprising;
   at least one processor, and
   one or more non-transitory memories including computer-executable instructions that, when executed by the at least one processor, cause the ranging apparatus to:
   receive a ranging request frame from a first device, wherein the ranging request frame comprises information about a first channel and information about a second channel, and wherein the ranging request frame further carries at least one piece of the following information: duration information of a first signal and ranging method information;
   send a ranging request response frame based on the ranging request frame, wherein the ranging request response frame comprises information about an available ranging time period, and the information about the available ranging time period is used to indicate a first time period;
   receive the first signal on the first channel in the first time period;
   perform frequency conversion on the first signal to obtain a second signal; and
   send the second signal on the second channel.

9. The ranging apparatus according to claim 8, wherein the information about the first channel comprises at least one piece of the following information:
   bandwidth of the first channel, a frequency channel number of the first channel, and a channel number of the first channel; and
   the information about the second channel comprises at least one piece of the following information:
   bandwidth of the second channel, a frequency channel number of the second channel, and a channel number of the second channel.

10. The ranging apparatus according to claim 9, wherein the first signal comprises at least one orthogonal frequency division multiplexing (OFDM) symbol, and the OFDM symbol does not comprise a guard interval.

11. The ranging apparatus according to claim 1, wherein the information about the first channel comprises at least one piece of the following information: bandwidth of the first channel, a frequency channel number of the first channel, and a channel number of the first channel; and the information about the second channel comprises at least one piece of the following information:

bandwidth of the second channel, a frequency channel number of the second channel, and a channel number of the second channel.

12. The ranging apparatus according to claim 11, wherein the first signal comprises at least one orthogonal frequency division multiplexing (OFDM) symbol, and the OFDM symbol does not comprise a guard interval.

13. The ranging apparatus according to claim 1, wherein the phase difference between carriers of the second signal comprises a phase difference between two adjacent carriers of the second signal.

14. The ranging apparatus according to claim 1, wherein carrier frequencies of the first signal are determined by the information about the first channel.

15. The ranging apparatus according to claim 8, wherein the computer-executable instructions, when executed by the at least one processor, further cause the ranging apparatus to amplify a power of the first signal to obtain the second signal.

16. A ranging method, comprising:

sending, by a first device, a ranging request frame, wherein the ranging request frame comprises information about a first channel and information about a second channel, and wherein the ranging request frame further carries at least one piece of the following information: duration information of a first signal and ranging method information;

receiving, by the first device, a ranging request response frame from a second device, wherein the ranging request response frame is sent by the second device based on the ranging request frame, the ranging request response frame comprises information about an available ranging time period, and the information about the available ranging time period indicates a first time period;

sending, by the first device, the first signal on the first channel in the first time period;

receiving, by the first device on the second channel, a second signal from the second device, wherein the second signal is a signal obtained after frequency conversion is performed on the first signal; and calculating, by the first device, a distance between the first device and the second device based on a phase difference between carriers of the second signal.

17. The method according to claim 16, wherein the information about the first channel comprises at least one piece of the following information:

bandwidth of the first channel, a frequency channel number of the first channel, and a channel number of the first channel; and the information about the second channel comprises at least one piece of the following information:

bandwidth of the second channel, a frequency channel number of the second channel, and a channel number of the second channel.

18. The method according to claim 17, wherein the first signal comprises at least one orthogonal frequency division multiplexing (OFDM) symbol, and the OFDM symbol does not comprise a guard interval.

19. The method according to claim 16, wherein the phase difference between carriers of the second signal comprises a phase difference between two adjacent carriers of the second signal.

20. The method according to claim 16, wherein carrier frequencies of the first signal are determined by the information about the first channel.

* * * * *